US012612299B2

(12) United States Patent
Szeteli et al.

(10) Patent No.: US 12,612,299 B2
(45) Date of Patent: Apr. 28, 2026

(54) CONTROL SYSTEM

(71) Applicant: AS Strömungstechnik GmbH, Ostfildern (DE)

(72) Inventors: Andreas Szeteli, Filderstadt (DE); Nico Fischer, Filderstadt (DE)

(73) Assignee: AS Stroemungstechnik GmbH, Ostfildern (DE)

( * ) Notice: Subject to any disclaimer, the term of this patent is extended or adjusted under 35 U.S.C. 154(b) by 146 days.

(21) Appl. No.: 18/409,843

(22) Filed: Jan. 11, 2024

(65) Prior Publication Data

US 2024/0270564 A1 Aug. 15, 2024

(30) Foreign Application Priority Data

Jan. 11, 2023 (DE) ........................ 102023100471.9

(51) Int. Cl.
*B67D 7/32* (2010.01)

(52) U.S. Cl.
CPC .................................. *B67D 7/3281* (2013.01)

(58) Field of Classification Search
CPC .................................................... B67D 7/3281
See application file for complete search history.

(56) References Cited

FOREIGN PATENT DOCUMENTS

| | | | | |
|---|---|---|---|---|
| DE | 102018214306 A1 * | 6/2020 | ........... | G01F 23/804 |
| DE | 202020107286 U1 * | 1/2021 | ............. | G01D 21/00 |
| DE | 102019131043 A1 * | 5/2021 | ............... | H04Q 9/00 |
| EP | 0977702 B1 | 9/2000 | | |
| EP | 3795535 A1 * | 3/2021 | ......... | G06Q 10/0875 |

OTHER PUBLICATIONS

Machine translation of DE-102018214306-A1.*
Machine Translation of DE-102019131043-A1.*
Machine translation of DE-202020107286-U1.*
Machine translation of EP-3795535-A1.*

* cited by examiner

*Primary Examiner* — Jeremy Carroll
(74) *Attorney, Agent, or Firm* — Von Rohrscheidt Patents

(57) ABSTRACT

A monitoring and control system (100) for containers (3). The containers (3) respectively have a container opening (5) for supplying and dispensing of stored goods. Each container (3) has a sensor unit (10) which has at least one sensor capturing environmental impacts, one processor evaluating sensor signals (13) and one interface unit (14) which operates in a contact-free manner.

23 Claims, 3 Drawing Sheets

CONTROL SYSTEM

CROSS REFERENCE TO RELATED APPLICATIONS

This application claims the priority of DE 102023100471.9 filed on 2023 Jan. 11; this application is incorporated by reference herein in its entirety.

BACKGROUND

The invention relates to a monitoring and control system and a method for operating a monitoring and control system.

The monitoring and control system is used for containers that are generally used to store goods, in particular liquids. The container generally has a container opening via which the goods can be dispensed from the container or filled into it.

In particular, the containers can be part of a dispensing system.

Such a dispensing system is known from EP 0 977 702 B1. This dispensing system is used for filling and draining containers, particularly barrels filled with liquid chemicals. The containers respectively have a dip tube via which liquids stored in the container can be dispensed and via which liquids can be filled into the container. The dispensing system has a dispense head that is connected to the dip tube of the respective container.

The liquid is then dispensed from the container via the dispense head or, as the case may be, filled into it. For this purpose, a pump is connected via the dispense head in order to dispensed or supply liquid.

Once the dispensing or supplying of liquid has been completed, the container opening of the respective container is closed with a closing means.

Thus, the container is ready for transportation. The container can then be transported, for example, to a place of use where the liquid is needed in order to carry out work processes or to a storage location.

One problem consists in that the containers are exposed to environmental influences during transportation, which can lead to the liquids stored in them being impaired.

One example of this are temperature influences. If a container is exposed to increased solar radiation, the liquid stored in it may be impaired. If this liquid is then dispensed from the container at a replacement location, its use can cause damage to work processes that are to be carried out with the liquid.

This also raises the problem of the burden of proof as to whether the damage occurred at the supplier of the container, during transportation of the container or on site at the customer's premises.

To solve this problem, it is known to place temperature trackers in delivery note pockets fastened to the outside of the containers.

The disadvantage here is that the temperature trackers can only be used to capture the outside temperatures, not the temperature inside the respective container, so that the measured temperature values are not very informative for any possible impairment of the container contents.

There is also the risk that the temperature trackers in the delivery note pockets can easily get lost.

The temperature trackers are generally designed in the form of USB sticks. To read out the data stored therein, a user must insert the USB stick into a computer such as a PC in order to carry out the corresponding evaluations, which is cumbersome and impractical. In addition, external USB sticks can be locked, which makes it even more difficult to read out data.

DE 10 2018 214 306 A1 relates to a data module for monitoring a container, which is preferably set up for the storage and/or transportation of liquids and/or solid materials. The data module can be brought into engagement with a module opening of the container in such a way that both the interior of the container and the exterior can be sensed by the data module. The data module comprises an interior sensor system with one or more sensors that are set up to detect physical variables inside the container; and/or an external space sensor system with one or more sensors which are set up to detect physical variables outside the container, the external properties of the container and/or to determine the position and/or orientation of the container; and a communication module which is set up to receive sensor data from the interior sensors and/or exterior sensors and has at least one transmitting device which is set up to transmit data based on the sensor data to an external receiving device.

EP 3 795 535 A1 (Szeteli) relates to a container management system with a number of containers to which identifying, electronically readable codes are assigned, and with a number of removal/filling stations which are designed to remove a liquid from the container or to supply it. Electronic reading units are assigned to the removal/filling stations, which can be used to read the codes on containers. Data read from electronic reading units is fed to a cloud-based computer system, which is designed to store and analyze the data.

DE 10 2019 131 043 A1 (Schiffer) relates to a device for level measurement, with a container for holding the filling material and with a sensor module with at least one level sensor, in particular an ultrasonic sensor, for measuring a level of the filling material in the container. The filling level sensor is arranged inside the container in an upper area, in particular on a lid of the container, with the sensor module having a communication interface. The device is characterized in that a transmitting and receiving device is provided outside the container, in that the communication interface is set up for wireless transmission of data from the sensor module, in particular measurement data from the level sensor, to the transmitting and receiving device. The transmitting and receiving device is set up to receive data from the sensor module wirelessly and to transmit data wirelessly, in particular via radio, to a remote unit, which preferably has an Internet connection.

DE 20 2020 107 286 U1 (Vega) relates to a sensor device for determining process variables in an industrial environment, comprising: a sensor base unit and a first extension module. The sensor base unit comprises a process variable determination unit for determining the process variable; a first mechanical interface for mechanically holding a first expansion module; and a first communication interface to the first extension module for transmitting measurement and/or control data. The first extension module comprises a second mechanical interface to the sensor base unit and a third mechanical interface for mechanically accommodating a second extension module; a second communication interface to the sensor base unit for transmitting measurement and/or control data; and a third communication interface to the second extension module for transmitting measurement and/or control data.

SUMMARY

The invention relates to a monitoring and control system (100) for containers (3). The containers (3) respectively have a container opening (5) for supplying and dispensing of stored goods. Each container (3) has a sensor unit (10) which has at least one sensor capturing environmental impacts, one processor evaluating sensor signals (13) and one interface unit (14) which operates in a contact-free manner.

DETAILED DESCRIPTION

The subject of the invention is to provide a simple and efficient monitoring and control system for containers of a dispensing system.

The features of the independent claims are provided to solve this object. Advantageous embodiments and useful further developments of the invention are described in the dependent claims.

The invention relates to a monitoring and control system for containers. The containers respectively have a container opening for filling in and dispensing goods. Each container has a sensor unit which has at least one sensor capturing environmental impacts, one processor evaluating sensor signals and one interface unit which operates in a contact-free manner. Each container has a dip tube opening out at the container opening. The dip tube closes at its outlet at the container opening with a dip tube closure and the sensor unit is arranged in the dip tube closure.

The invention also relates to a corresponding method.

Advantageously, the containers are part of a dispensing system.

A significant advantage of the monitoring and control system according to the invention consists in that the sensor unit is integrated into a component of the respective container. This means that the sensor unit is inseparably connected to the container, which prevents the sensor unit from being lost. On the other hand, a high level of tamper protection is achieved, as unauthorized replacement of sensor units on a container is prevented.

Furthermore, it is advantageous that by integrating the sensor unit into a container component with the at least one sensor, the impact of environmental impacts on the good in the container can be captured directly, whereby the sensor signals can be used to make a reliable statement as to whether the good in the container have been impaired.

Finally, it is advantageous that the sensor unit has an interface unit with which contact-free data from the sensor unit can be read out to an external unit, i.e. no electromechanical connection means need to be provided.

It is particularly advantageous for the sensor unit to be an encapsulated unit.

Aggressive, hazardous chemicals may be stored in the respective container. In particular, goods in the form of liquids are stored in the containers.

The encapsulation of the sensor unit prevents the chemicals stored in the container from attacking and damaging the components of the sensor unit.

According to the invention, each container, which is part of a dispensing system, has a dip tube opening out at the container opening.

The dip tube can be locked at its outlet at the container opening with a dip tube closure. The sensor unit is arranged in the dip tube closure.

The dispensing system has a dispense head which can be connected to the container opening of a container. The good can be dispensed from or filled into the container via the dispense head.

The container closure or dip tube closure forms a compact, modular unit with the sensor unit, wherein the container closure or dip tube closure forms a structural unit with the container, i.e. there is a clear assignment of the container closure or dip tube closure to the respective container. The connection between the container closure or dip tube closure and the container can be secured by a tamper-evident seal. The container closure or dip tube closure can only be removed from the container by destroying the tamper-evident seal which generally forms a mechanical unit.

According to an advantageous embodiment, the sensor unit has a temperature sensor.

In particular, the temperature sensor is used to measure the temperature of a gas phase present in the respective container.

For this purpose, the temperature sensor can be designed as an infrared temperature sensor.

The temperature sensor can thus be used to precisely capture the temperature of the goods in the container.

Alternatively or additionally, the sensor unit has a vibration sensor.

In particular, the vibration sensor is designed in the form of an acceleration sensor.

The vibration sensor can be used to capture shock loads on the container that can lead to damage to the goods in the container.

The sensor signals from the sensor(s) of the sensor unit are evaluated in the processor of the sensor unit. The term processor generally comprises computer modules, wherein the processor can preferably be designed in the form of a microprocessor.

It is particularly advantageous to operate the processor in a sleep mode.

The sleep mode is a power-saving standby status of the processor. The sleep mode can be activated or deactivated by a watchdog or similar. The sleep mode allows the processor to be controlled so that it only evaluates sensor signals within predefined time intervals. This takes advantage of the fact that it is not necessary to continuously evaluate all sensor signals in order to capture environmental impacts. Rather, it is sufficient to carry out the evaluation only within discrete time intervals.

Advantageously, the sensor unit has a charging device that can be connected in a contact-free manner to an external charging station.

This ensures a reliable power supply to the sensor unit even over long periods of time.

Advantageously, the charging device is an NFC charger.

Correspondingly, the interface unit has an NFC interface module.

Such NFC units work in a contact-free manner and do not require any electromechanical connection elements.

The sensor unit functions advantageously in such a way that output signals are generated in the processor depending on sensor signals from the at least one sensor. The output signals are read out to a mobile terminal device via the interface unit.

It is particularly advantageous for the output signals to be forwarded from the mobile terminal device to a cloud-based computer system.

Reading the output signals with the mobile terminal device, which is designed in particular in the form of a smartphone, is done in contact-free manner and thus does not require any electronic connection means.

Advantageously, the sensor unit sends a website address to the mobile terminal device, whereby the mobile terminal device provides the connection to a cloud, i.e. a cloud-based computer system. The cloud provides a distributed system that networks individual units regardless of their location. In particular, suppliers and customers of the containers can access the cloud.

Advantageously, the output signals are linked to an identifier that clearly identifies the sensor unit.

This ensures that the output signals are clearly assigned to the respective sensor unit and thus also to the respective container, in particular in the cloud.

A particular advantage is that each container is uniquely identified by a container identifier stored in an RFID chip. The container identifier can be read out to the cloud-based computer system, where it is linked to the identifier of the sensor unit.

Containers are labeled and identified in a known manner using the container identifiers stored in the RFID chips. By linking the identifiers of the sensor units with the container identifiers, the RFID system is used for a clear and unique assignment of the sensor units to the containers.

According to an advantageous embodiment, a binary status signal is generated in the sensor unit as an output signal the signal statuses of which indicate whether the status of the container is faulty or not.

According to an alternative embodiment, a binary status signal is generated in the cloud-based computer system from output signals generated in the sensor unit. The signal statuses indicate whether the status of the container is faulty or not.

In both cases, a release signal or a lock signal is generated in the cloud-based computer system depending on the status signal. The dispensing or filling of goods [from and] into the respective container is only released with a released signal.

Advantageously, the container for which the release signal or lock signal is generated is identified by the container identifier.

The status signal or signals are advantageously generated by a threshold value evaluation of the sensor signals from the sensor unit's sensor(s).

If a temperature above a threshold value is detected for the temperature sensor, a critical temperature is present which leads or can lead to impairment of the good. Accordingly, a lock signal is generated in the cloud so that no more good can be dispensed from the container.

If the vibration sensor registers a vibration above a threshold value, a lock signal is generated as well.

This prevents impaired good from being removed from the container, which could lead to damage in subsequent work processes involving the good.

The lock signal generated via the cloud is tamper-proof. Even if a user were to connect such a container to a dispense head of a dispensing system, it would not be possible to dispense the good with this.

BRIEF DESCRIPTION OF THE DRAWINGS

The invention is explained in the following with reference to the drawings. They show.

DETAILED DESCRIPTION OF THE PREFERRED EMBODIMENTS

Figure 1:
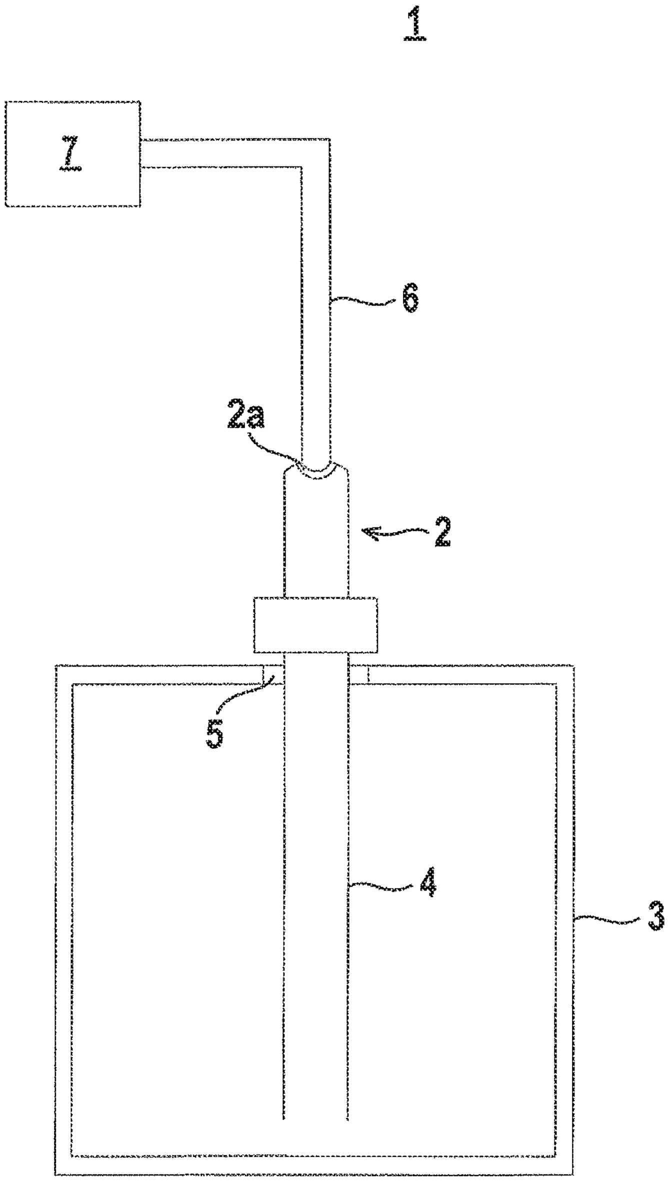
FIG. 1: A schematic illustration of a dispensing system with an associated container.

FIG. 1 shows a dispensing system 1 in schematic form. The dispensing system 1 comprises a dispense head 2 that can be attached to a container 3 which can be designed particularly in the shape of a barrel. A liquid is stored as good in the container 3. Liquids stored in such containers 3 are in particular liquid specialty chemicals.

The container 3 has a dip tube 4. The dip tube 4 is mounted in a bung head which sits in a container opening 5 of the container 3 and is thus securely connected to the container 3. The longitudinal axis of the dip tube 4 runs in the vertical direction.

The dispense head 2 is used for dispensing liquids from the container 3. The dispense head 2 can also be used for filling containers 3. For this purpose, the dispense head 2 has a liquid connection 2*a* at its upper end. A line 6 that leads to a pump 7 is connected to this liquid connection 2*a*. The line 6 can be constituted in the form of a hose.

The pump 7 is controlled by a control unit (not shown).

Figure 2:
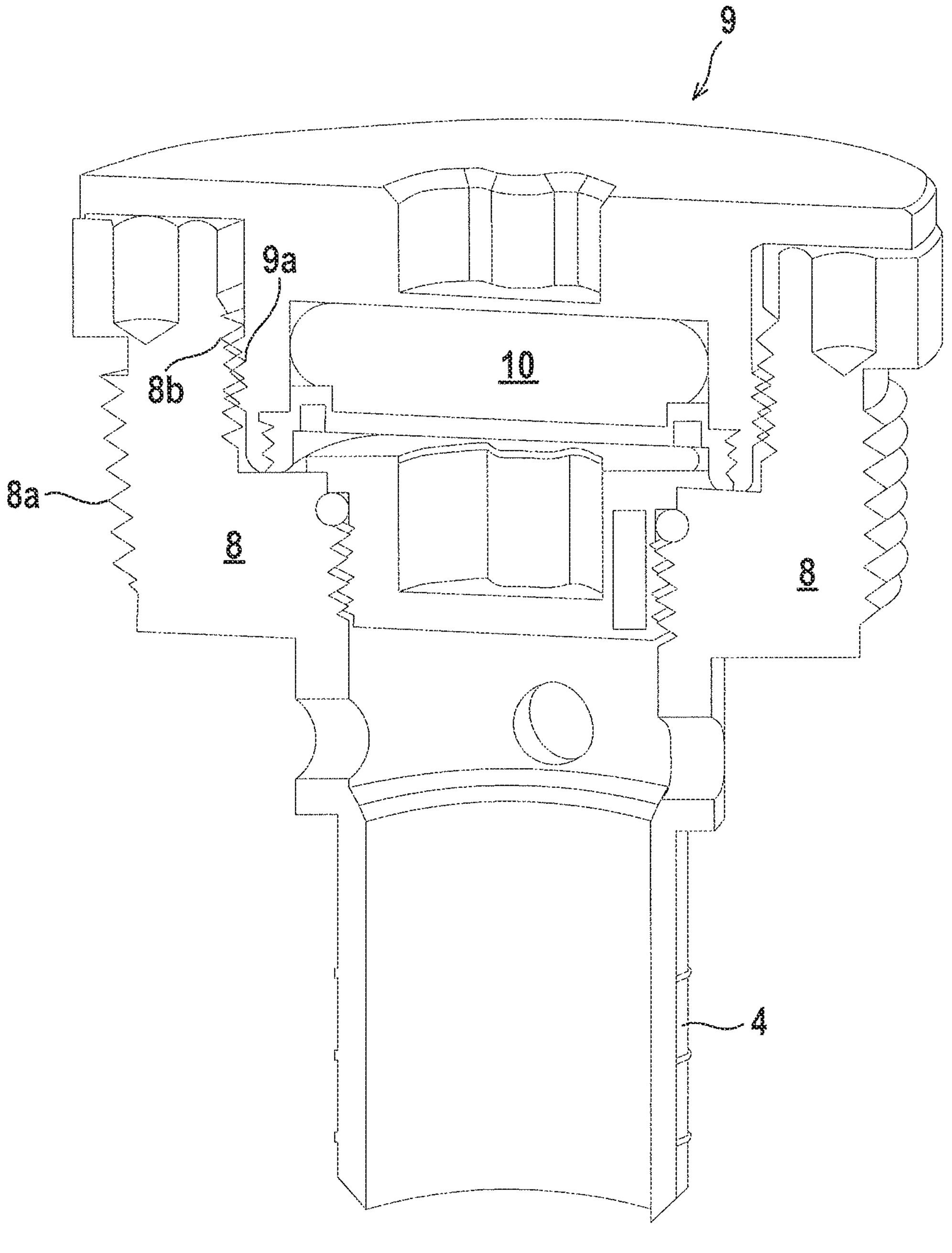
FIG. 2: Dip tube of the container according to FIG. 1 with an assigned dip tube closure and a radio transmitter.

FIG. 2 shows an enlarged partial view of the upper region of the dip tube 4, which, at its upper end, has a head part 8 that is mounted in the container opening 5. In the present case, the head part 8 is screwed into the container opening 5. For this purpose, the head part 8 has an outer thread 8*a*.

The opening at the upper end of the dip tube 4 can be closed with a dip tube closure 9. In this case, the dip tube closure 9 is screwed onto the dip tube 4. For this purpose, the dip tube closure 9 has an outer thread 9*a*, and the head part 8 has a corresponding inner thread 8*b*.

The container 3 closed with the dip tube closure 9 forms a transportable unit. In order to be able to identify the container 3, an RFID chip (not shown) is present on the container 3, for example on the dip tube closure 9 or on the dip tube 4 itself in which RFID chip a container identifier is stored.

Figure 3:
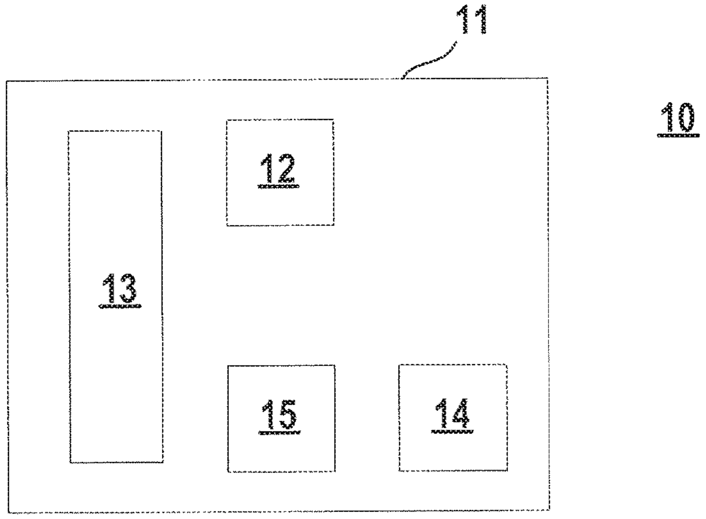
FIG. 3: First exemplary embodiment of a sensor unit for a container.
Figure 4:
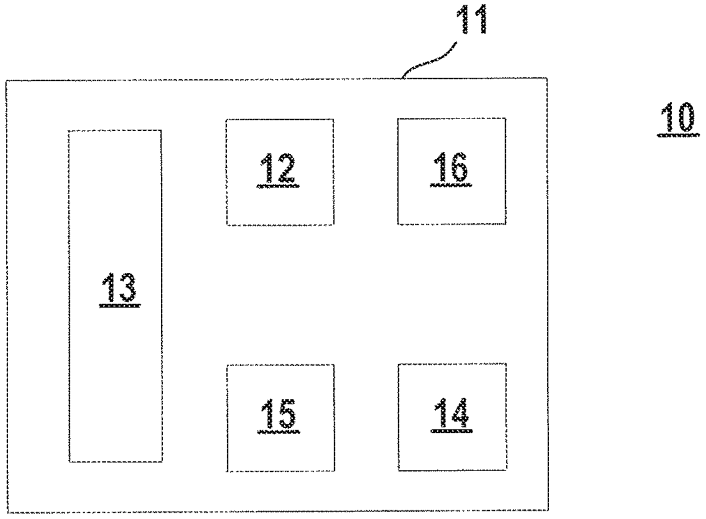
FIG. 4: Second exemplary embodiment of a sensor unit for a container.

According to the invention, a sensor unit 10 is provided in the dip tube closure 9. Examples of such sensor units 10 are shown in FIGS. 3 and 4. The components of the sensor unit 10 are encapsulated in a housing 11. The sensor unit 10 generally has at least one sensor for capturing environmental impacts acting on the container 3.

The sensor unit 10 according to FIG. 3 has a temperature sensor 12 with which the temperature of the gas phase in the container 3 is measured. The temperature sensor 12 can, for example, be designed in the form of an infrared temperature sensor 12, wherein the housing 11 is then transparent to infrared radiation.

The sensor unit 10 also has a processor 13 in which the sensor signals from the temperature sensor 12 are evaluated. Advantageously, the evaluation is not carried out continuously, but within discrete time intervals. For this purpose, the processor 13 is operated in an energy-saving sleep mode.

Output signals generated in the processor 13 are output to external units via an interface unit 14 which operates in a contact-free manner. Advantageously, the interface unit 14 has an NFC interface module.

Furthermore, the sensor unit 10 has a charging device 15 which can be used to carry out contact-free charging processes in order to ensure the power supply to the components of the sensor unit 10. Advantageously, the charging device 15 is designed as an NFC charging device.

The sensor unit 10 according to FIG. 4 differs from the embodiment according to FIG. 3 only in that, in addition to the temperature sensor 12, a vibration sensor 16 is also present, wherein such vibration sensor's 16 output signals are also evaluated in the processor 13. Advantageously, the vibration sensor 16 is designed in the form of an acceleration sensor. The vibration sensor 16 captures vibrations of the container 3. In particular, shock loads acting on the container 3 are captured.

Figure 5:
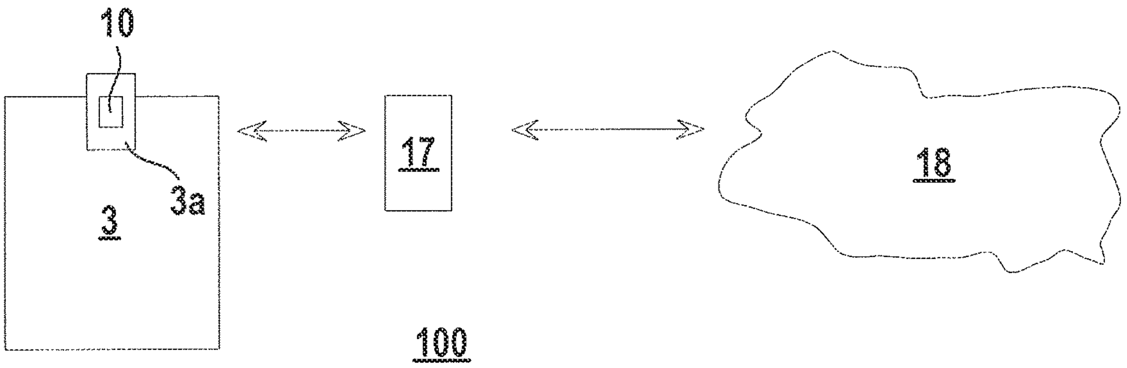
FIG. 5: Exemplary embodiment of the monitoring and control system according to the invention.

A monitoring and control system 100, an example of which is shown in FIG. 5, is provided with the sensor unit 10 of the containers 3. FIG. 5 shows a container 3 without dip tube 4. In this case, the sensor unit 10 is integrated in a container closure 3*a*. Output signals generated in the processor 13 of a sensor unit 10 are read out via the interface unit 14 to a mobile terminal device, which in this case is a smartphone 17. The sensor unit 10 also sends a website address that is used to connect the smartphone 17 to a cloud-based computer system 18.

This allows the output signals of the sensor unit 10 to be fed to a cloud-based computer system 18, i.e. a cloud, via the smartphone 17.

The monitoring and control system 100 may generally have a plurality of containers 3 with sensor units 10 which are also spatially distributed. The output signals from the sensor unit 10 are stored and evaluated in the cloud-based computer system 18 in a spatially completely decoupled manner. Customers and suppliers of the containers 3 can access the cloud-based computer system 18, preferably by entering access codes or other authorizations.

Advantageously, the output signals for each container 3 are linked to an identifier that clearly identifies the sensor unit 10.

The data and the identifier are linked in the cloud-based computer system 18 with the container identifier present in the RFID chip of the respective container 3, whereby the output signals of the sensor unit 10 can be uniquely assigned to the respective containers 3.

The evaluation of the signals from the sensor(s) in the processor 13 is advantageously carried out in such a way that by means of a threshold value evaluation a binary status signal is generated from the sensor signals.

If the signal from the temperature sensor 12 exceeds the respective threshold value, a critical temperature is present, which can lead to impairment of the good in the respective container 3. If the signal from the vibration sensor 16 exceeds the respective threshold value, a critical vibration is present, which can lead to impairment of the good in the respective container 3.

In the cloud-based computer system 18, the status signals from the sensors of the sensor unit 10 are advantageously evaluated in such a way that if a signal status above the threshold value is registered at a sensor, i.e. at the temperature sensor 12 in the embodiment of FIG. 3 and at the temperature sensor 12 or the vibration sensor 16 in the embodiment of FIG. 4, a lock signal is generated for the respective container 3. A release signal is only generated in the cloud-based computer system 18 if none of the sensors of the sensor unit 10 of a container 3 receives a signal status above the threshold value.

The release or lock signal for a container 3 is linked in the cloud-based computer system 18 with the container identifier of the RFID chip, thus providing a clear assignment of this container 3.

The release and lock signals via the cloud-based computer system 18 also monitor and control the dispensing system 1. A dispensing of liquid from a container 3 is only released for the dispensing system 1 if the release signal is present for the container 3. If, on the other hand, the lock signal is stored for a container 3, the dispensing system 1 is locked accordingly so that no liquid can be dispensed from the container 3.

LIST OF REFERENCE NUMERALS (1) dispensing system
(2) dispense head
(2*a*) liquid connection
(3) container
(3*a*) container closure
(4) dip tube
(5) container opening
(6) line
(7) pump
(8) head piece
(8*a*) outer thread
(9) dip tube closure
(9*a*) outer thread
(10) sensor unit
(11) housing
(12) temperature sensor
(13) processor
(14) interface unit
(15) charging device
(16) vibration sensor
(17) smartphone
(18) cloud-based computer system
(100) monitoring and control system

The invention claimed is:

1. A monitoring and control system (100) for containers (3), wherein the containers (3) respectively have a container opening (5) for filling in and dispensing goods, each container (3) comprising a sensor unit (10) which has at least one sensor which captures an environmental impact, a processor (13) which evaluates sensor signals, and one interface unit (14) which operates in a contact-free manner, wherein a dip tube (4) opening out at the container opening (5) is present in each container (3), wherein the dip tube (4) is lockable at its outlet at the container opening (5) with a dip tube closure (9), and wherein the sensor unit (10) is arranged in the dip tube closure (9).

2. The monitoring and control system (100) according to claim 1, characterized in that the container or containers (3) are part of a dispensing system (1).

3. The monitoring and control system (100) according to claim 2, characterized in that the dispensing system (1) has a dispense head (2) connectable to the container opening (5) of a container (3), wherein goods can be dispensed from or filled into the container (3) via the dispense head (2).

4. The monitoring and control system (100) according to claim 1, characterized in that the sensor unit (10) is an encapsulated unit.

5. The monitoring and control system (100) according to claim 1, characterized in that the container opening (5) is lockable with a container closure, and in that the sensor unit (10) is integrated into the container closure.

6. The monitoring and control system (100) according to claim 1, characterized in that goods in the form of liquids are stored in the containers (3).

7. The monitoring and control system (100) according to claim 1, characterized in that the sensor unit (10) has a temperature sensor (12).

8. The monitoring and control system (100) according to claim 7, characterized in that the temperature of a gas phase present in the respective container (3) is measured by means of the temperature sensor (12).

9. The monitoring and control system (100) according to claim 1, characterized in that the sensor unit (10) has a vibration sensor (16).

10. The monitoring and control system (100) according to claim 9, characterized in that the vibration sensor (16) is designed in the form of an acceleration sensor.

11. The monitoring and control system (100) according to claim 1, characterized in that the processor (13) is operable in sleep mode.

12. The monitoring and control system (100) according to claim 1, characterized in that the sensor unit (10) has a charging device (15) which can be coupled to an external charging station in a contact-free manner.

13. The monitoring and control system (100) according to claim 12, characterized in that the charging device (15) is an NFC charging device.

14. The monitoring and control system (100) according to claim 1, characterized in that the interface unit (14) has an NFC interface module.

15. The monitoring and control system (100) according to claim 1, characterized in that output signals are generated in the processor (13) in response to sensor signals from the at least one sensor, which are read out to a mobile terminal device via the interface unit (14).

16. The monitoring and control system (100) according to claim 15, characterized in that the output signals are forwarded from the mobile terminal device to a cloud-based computer system (18).

17. The monitoring and control system (100) according to claim 15, characterized in that the output signals are linked to an identifier clearly identifying the sensor unit (10).

18. The monitoring and control system (100) according to claim 17, characterized in that each container (3) is identified with a container identifier stored in an RFID chip, wherein the container identifier can be read out into the cloud-based computer system (18) and is linkable there with the identifier of the sensor unit (10).

19. The monitoring and control system (100) according to claim 15, characterized in that a binary status signal is generated in the sensor unit (10) as an output signal, the signal statuses of which indicate whether the status of the container (3) is faulty or not.

20. The monitoring and control system (100) according to claim 19, characterized in that a release signal or a lock signal is generated in the cloud-based computer system (18) in response to the status signal, wherein the dispensing or filling of goods [from or] into the respective container (3) is only released with a release signal.

21. The monitoring and control system (100) according to claim 20, characterized in that the container (3) for which the release signal or lock signal is generated is identified by means of the container identifier.

22. The monitoring and control system (100) according to claim 15, characterized in that a binary status signal is generated in the cloud-based computer system (18) from output signals generated in the sensor unit (10), the signal statuses of which indicate whether the status of the container (3) is faulty or not.

23. A method for operating a monitoring and control system (100) for containers (3), wherein the containers (3) respectively have a container opening (5) for filling in and dispensing goods, characterized in that each container (3) has a sensor unit (10) which has at least one sensor which captures an environmental impact, one processor (13) which evaluates sensor signals, and one interface unit (14) which operates in a contact-free manner, wherein a dip tube (4) opening out at the container opening (5) is present in each container (3), wherein the dip tube (4) is lockable at its outlet at the container opening (5) with a dip tube closure (9), and wherein the sensor unit (10) is arranged in the dip tube closure (9).

* * * * *